United States Patent Office 2,907,667
Patented Oct. 6, 1959

2,907,667

PROCESS OF CALCINING GYPSUM

Elmer S. Johnson, Arlington Heights, Ill., assignor to United States Gypsum Company, Chicago, Ill., a corporation of Illinois No Drawing. Application March 30, 1956
Serial No. 574,979

13 Claims. (Cl. 106—111)

This invention relates to a process of calcining gypsum, and more particularly to a method of preparing alpha gypsum, by the use of steam together with certain crystal-habit-modifying materials.

There are basically two forms of calcined gypsum plaster now being prepared commercially. The outstanding differences between these two plasters are (1) their normal consistency, i.e., the amount of water in cubic centimeters required to gauge 100 grams of the plaster so that it will just pour from a cup; and (2) the physical nature of the respective individual plaster particles. One of these forms of plaster is referred to as regular calcined gypsum and is prepared by heating the dihydrate at atmospheric pressure in either a kettle or a rotary calciner. The resulting product has a consistency of between about 60 to 80 cc. per 100 grams of material. An examination of this material under the microscope will show that it consists of very small crystals which are somewhat loosely agglomerated together into larger size particles. These extremely small crystals are presumably caused by the rupture of fragments of gypsum crystals when the water escapes as steam during the calcining step. The second form of plaster now being used commercially is known as alpha gypsum. This material is characterized by a much lower consistency than the above, requiring only between 28 to 45 cc. of water per 100 grams to give a pourable slurry. This material is further characterized by each particle of the finely ground plaster in general being mono-crystalline, that is, formed from a single or fragment of a crystal and not in general from a loose cluster of very small crystals as in the case of regular calcined gypsum. This second product is prepared by heating the dihydrate under controlled vapor pressure conditions in the presence of steam or in an aqueous solution.

The dissimilarity in the physical nature of the plaster particles of these two forms of calcined gypsum gives rise to a marked difference in their surface properties and accounts primarily for the difference in their consistencies. The alpha gypsum particles being more unicrystalline provide a relatively smooth surface free of clusters of minute crystal particles which latter tend to take up water and hence increase the consistency. The clusters of smaller size crystals tend to have a greater surface area per unit weight than the larger single crystals. This is reflected in an increase in the consistency as it has been found that the lower the surface area per unit weight the lower the consistency. The surface area in square centimeters per gram, commonly referred to as the Blaine coefficient, see ASTM C204–51, is a means of evaluating the surface characteristics of the particle. Besides having each particle unicrystalline so as to reduce the surface area per unit weight, it is also important to have the particle as close to a cube or a sphere as possible, which are the geometric forms having a minimum of surface to volume ratio. It has been well established that in general, the lower the consistency the greater the strength of the resultant cast. For example, a plaster cast formed from alpha gypsum plaster poured at a consistency of about 30 cc. will have a compressive strength as high as 10,000 pounds per square inch, while one poured at a consistency of about 45 cc. may have a strength under 5,000 pounds per square inch. Hence, it is important for some purposes to have the consistency as low as possible in order to obtain a strong cast.

The first form of calcined gypsum mentioned above dates back to antiquity while the second form, or alpha gypsum, has not been known until quite recently when the first method of preparing it was set forth in Patent No. 1,901,051, issued to Randel and Dailey. As disclosed in this patent, lump gypsum is calcined in an atmosphere of steam under certain controlled conditions to form crystals of calcined gypsum which are somewhat elongated and when the product is properly ground it results in a plaster having a consistency of 40 to 45 cc. This was so much lower than the 60 and 80 cc. consistency obtained with regular plaster, that its greater strength, arising out of the lower consistency, was a sensational advance in the art. Compressional strengths higher than 5,000 pounds were secured. Later a patent issued to Haddon, No. 2,448,218, which discloses a process of making alpha gypsum in which the individual crystals are squattier or more cubic than those made in accordance with the process disclosed in the Randel and Dailey patent and as a result plaster made therefrom requires even a lesser amount of water for gauging with consequent further increase in the strength of casts made therefrom. However, in accordance with the Haddon method, the gypsum is heated in a finely powdered form with agitation in a solution of certain dicarboxylic acids or their salts under pressure and at a temperature between 125° C. to 160° C. for at least two hours. This is an expensive process owing to the loss of the dicarboxylic acid, the cost of heating the liquid and the expense of agitation. Also, the cost of the equipment to carry out this process is excessive.

Accordingly, it is an object of this invention to produce a calcined gypsum having a very low consistency.

It is a further object of this invention to prepare an improved form of alpha gypsum without the use of liquids during calcination.

A still further object of this invention is to provide a process for preparing a low consistency plaster using a wide range of gypsum rock sizes without the need of agitation.

It is also an object of this invention to provide a process employing certain compounds which have the properties of influencing the type of hemihydrate crystal formed during the calcination of gypsum in an economical manner so that a relatively small amount is needed to obtain effective results.

Another object of this invention is to calcine gypsum to alpha gypsum of low consistency in an atmosphere of steam.

It is also a further object of this invention to convert gypsum to an improved alpha gypsum using certain crystal-habit-modifying materials such as soluble dicarboxylic acids or their salts by a means which will assure a minimum loss of the soluble material.

An additional object of this invention is to use wetting agents in a novel manner to improve the calcination of gypsum.

Various other objects will readily occur to those skilled in the art of which this invention is a part.

It has been discovered that when the surface of lump gypsum (i.e., essentially all particles being coarser than that which will pass through a 16 mesh screen) is treated with a solution of a crystal-habit-modifier such as certain dicarboxylic acids or their salts, i.e. potassium succinate, that the lumps can be calcined with steam alone under pressure to form alpha gypsum without being stirred or surrounded by a solution, as in the Haddon process, and that the resulting plaster when ground will have substantially the same properties as that obtained by the latter process. Thus the product formed following the Haddon patent is obtained in a much simpler manner. It is preferred to treat the surface of the gypsum lumps by soaking them in the crystal-habit-modifier solution as this assures a complete coverage; however, for convenience and to effect certain plant economies, the lumps are usually sprayed with the solution as it passes through a hopper into the autoclave. If the lumps are soaked in the solution, the immersion time may be as short as one minute or less. Any means of effecting a coating of the gypsum particles with the solution is within the scope of this invention. For example, the gypsum rock may be placed directly into the autoclave, the solution then added to completely immerse the rock, the solution drained off, and steam added to effect the calcination. If desired, the vessel in which the rock is immersed may be evacuated before or after the solution has been added, followed by atmospheric or higher pressures to force the solution further into the interior of the rock.

The following examples are given to set forth certain preferred embodiments of this invention:

EXAMPLE 1

Lumps of raw gypsum rock having a size range between ½ and 1½ inches in diameter are soaked in a 17% aqueous solution of potassium succinate at room temperature for about five minutes, the surplus solution is then drained off and the rock is then placed in an autoclave wherein it is subjected to the action of saturated steam at a pressure of 20 p.s.i. gauge for about 12 hours. The calcined rock is then removed from the vessel and dried without permitting the temperature to drop sufficiently to cause the moisture contained in the lumps to rehydrate the calcined gypsum. The drying temperature should preferably be above 212° F. The dried calcined gypsum is then ground under controlled conditions to as low a Blaine coefficient as possible consistent with the plasticity desired. When properly prepared the consistency of the plaster product will be around 32 cc. A shorter calcination time, such as about 8 hours needed for economical commercial operation, may be used with a consequent slight increase in the consistency.

EXAMPLE 2

Gypsum rock of a size between 1½ to ½ inches in diameter is thoroughly wetted with a 10% aqueous solution of potassium succinate by spraying it as the rock passes through a small hopper. In addition to the potassium succinate the solution also contains .05% by weight of a wetting agent such as Nacconol Z, an alkyl aryl sulfonate. Between 9 to 10 gallons of the solution is sprayed per ton of rock. This is more than is required, as about four gallons of solution per ton of rock is all that is usually needed to thoroughly wet the gypsum particles of this size. The surplus solution is collected and reused. The treated lumps are discharged into an autoclave where they are subjected to a steam pressure of 18 p.s.i. gauge for 16 hours.

It has been discovered that the calcination time may be markedly decreased without any subsequent increase in the consistency of the finished plaster if the calcination is carried out at the usual lower pressure for a certain length of time and then progressively increased. Thus in Example 1, the pressure can be held at about 18 p.s.i. gauge for 5 hours, then increased to 20 pounds for 2 hours and then to 30 pounds for 2 hours. This same condition can be used for other solution concentrations with or without a surface active agent. When the above has been followed, it will be found that the lumps will be completely calcined to a low consistency product. In a continuous operation, additional time must be allowed to bring the autoclave up to full pressure and for dumping and refilling. The same type equipment as is used for carrying out the Randel and Dailey process may be used to carry out this invention. The only additional equipment needed is that for making up the solution and introducing it upon the surface of the rock such as by soaking or spraying.

After the rock has been calcined, the surplus water is removed by passing through a dryer, care being exercised to maintain the temperature above 212° F. so as to prevent the particles from rehydrating. A dryer temperature of between 240° F. to 245° F. has been found to be quite satisfactory. Caution should be followed in drying so as not to further calcine the product to the anhydrite state. The combined moisture in the resulting product should be between 5% to 6% after the rock has been dried and ground. Grinding can be carried out in a Buhr, hammer or Raymond mill and, if a greater degree of fineness is desired, then in a tube mill. The particle size relation obtained by grinding is an important factor in securing the desired consistency, hence close attention should be given to this operation so as to obtain as low a Blaine coefficient as possible consistent with the plasticity required. A coarse grind gives a low Blaine coefficient and low consistency but also a low plasticity which may not be suitable for some purposes. Hence a balance between consistency, Blaine coefficient and the plasticity should be reached. A consistency as low as 30 cc. or lower can be obtained with fairly good plasticity if close attention is given to calcining and grinding details.

While the above is given as an example of certain preferred embodiments of this invention, it is not the intention to be limited thereby for many variations can be made in the process forming the subject of this invention and still be within the ambit thereof as defined by the appended claims. For example, it is possible to use rock sizes varying from about 2 inches to 16 mesh and a concentration of from about 1% to about 35% of modifier in the solution used. Also other suitable crystal-habit-or-growth modifiers or calcination inhibitors may be used, such, for example, as those set forth in the above referred to patent issued to Haddon.

The time required for the calcination is a function of the pressure, the concentration of the modifier upon the surface of the particle, the kind of crystal-habit-modifier, and the size of rock. A reduction in the concentration of potassium succinate or other modifier reduces the calcination time but raises the consistency. Care should be used in selecting the calcination conditions which will render the process commercially feasible.

The pressure of the saturated steam used to calcine the treated rock may vary from about 14 to about 40 p.s.i. gauge and need not be held at one particular pressure throughout the calcination cycle as it can be adjusted to suit optimum operating conditions in which case the time must be varied accordingly. In general, it is preferred to use a higher pressure than that required by the process set forth in the Randel and Dailey Patent No. 1,901,051. Only 16 to 17 p.s.i. gauge is sufficient for the latter, while about 20 p.s.i. gauge is preferred under comparable conditions for the process forming the subject of the present invention. The time-temperature relation can be readily determined by trial from information contained in the forthcoming tables. Caution should be exercised at the higher concentrations of the impregnating solution, especially with the finer size lumps so as not to calcine too long and form anhydrite which will increase the consistency and also decrease the usefulness of the plaster. In order to aid those skilled in the art to practice this invention, the following data has been supplied for a wide range of conditions. Other variations, not given, can readily be evaluated and followed by interpolation from the information supplied or by trial. In all cases the same source of gypsum rock was used. The gypsum rock from this source had a purity of about 97%. Unless otherwise indicated, the solutions were all made from potassium succinate without a surface active agent.

Table 1.—Effect of rock size, concentration of solution, impregnation and calcination times upon the consistency and combined water

| Rock size | Solution Concen. (percent) | Impregnation Time [1] (Min.) | Calcination Pressure (p.s.i.g.) | Calcination Time (Hours) | Consistency (cc.) | Combined $H_2O$ (percent) |
|---|---|---|---|---|---|---|
| ½″ to 8 mesh | 35.0 | 4 | 20 | 7 | 33 | 5.99 |
| Do | 37.5 | 5 | 20 | 6½ | 33 | 5.69 |
| Do | 26.68 | 5 | 20 | 6½ | 32 | 6.09 |
| 4 to 8 mesh | 35.5 | 5 | 20 | 6½ | 35.5 | 4.92 |
| Do | 17.75 | 5 | 20 | 6½ | 32.5 | 6.06 |
| ¼″ to ⅛″ | 35.0 | 5 | 20 | [2] 16 | 35.0 | 5.10 |
| Do | 25.0 | 5 | 20 | [2] 16 | 31.0 | 5.91 |
| Do | 15.0 | 5 | 20 | [2] 16 | 31.5 | 6.14 |
| Do | 5.0 | 5 | 20 | [2] 16 | 31.5 | 6.26 |
| ½″ to ¼″ | 35.0 | 5 | 20 | [2] 16 | 32.5 | 5.85 |
| Do | 25.0 | 5 | 20 | [2] 16 | 31.5 | 5.84 |
| Do | 15.0 | 5 | 20 | [2] 16 | 31.5 | 6.25 |
| Do | 5.0 | 5 | 20 | [2] 16 | 35.5 | 6.19 |
| 1½″ to ¾″ | 35.0 | 5 | 20 | [2] 16 | 34.5 | 6.15 |
| Do | 25.0 | 5 | 20 | [2] 16 | 33.5 | 6.15 |
| Do | 15.0 | 5 | 20 | [2] 16 | 32.0 | 6.22 |
| Do | 5.0 | 5 | 20 | [2] 16 | 37.5 | 6.16 |
| 1½″ to ½″ | 7.5 | 5 | 20 | [2] 16 | 36.0 | 6.26 |
| Do | 12.5 | 5 | 20 | [2] 16 | 32.0 | 6.25 |
| Do | 17.5 | 5 | 20 | [2] 16 | 31.5 | 6.03 |
| Do | 22.5 | 5 | 20 | [2] 16 | 32.0 | 5.96 |
| Do | 7.5 | 30 | 20 | [2] 16 | 33.0 | |
| Do | 12.5 | 30 | 20 | [2] 16 | 31.5 | |
| Do | 17.5 | 30 | 20 | [2] 16 | 31.5 | |
| Do | 22.5 | 30 | 20 | [2] 16 | 32.0 | |
| Do | 7.5 | 5 | 18 | [2] 16 | 31.5 | |
| Do | 12.5 | 5 | 18 | [2] 16 | 31.5 | |
| Do | 17.5 | 5 | 18 | [2] 16 | 30.5 | |
| Do | 22.5 | 5 | 18 | [2] 16 | 30.5 | |

[1] All impregnations were made at atmospheric pressure.
[2] The time of 16 hours is for pressures held overnight and is perhaps longer than necessary. The exact minimum times for all conditions were not determined.

Table 2

| Rock Size | Solution Concen. (percent) | Impregnation Pressure (Lbs.) | Impregnation Time (Hrs.) | Calcination Pressure (p.s.i.g.) | Calcination Time (Hrs.) | Consistency (cc.) | Combined $H_2O$ (percent) |
|---|---|---|---|---|---|---|---|
| ½″ to ¼″ | 35.0 | 100 | 2 | 20 | 7 | 51.0 | 3.53 |
| 1½″ to ¼″ | 35.0 | 100 | 2 | 20 | 7 | 40.0 | 4.96 |
| Do | 35.0 | 100 | 4 | 20 | 7 | 42.0 | 4.55 |
| ½″ to ¼″ | 2.64 | 100 | 2 | 20 | 7 | 37.0 | 6.18 |
| 1½″ to ½″ | 2.64 | 100 | 2 | 20 | 7 | 35.0 | 6.19 |

Table 3 [1].—Effect of various types of surface active agents upon the consistency and combined moisture

| Trade Name and Manufacturer | Type | Class and Formula | Consistency (cc.) | Combined $H_2O$, percent |
|---|---|---|---|---|
| Sterox AJ (Monsanto) | Nonionic | Aliphatic Nonionic Polyoxyethylene Ether. | 30 | 6.22 |
| Victawet 12 (Victor Chem.) | do | $R-O-P=O$ with $OR'$ groups; R=Med. Alkyl and R'=Water Solubilizing groups. | 29.5 | 6.24 |
| Igepal-CO-630 (Antara Chem. Div.) | do | Alkyl Phenoxy Polyoxyethylene Ethanol. | 30 | 6.22 |
| Tergitol 08 (Carbide & Carbon) | Anionic | Sod. Sulfate Deriv. of 2-Ethyl Hexanol-2. | 30 | 6.25 |
| Santomerse 30X (Monsanto) | do | Alkyl Aryl Sod. Sulfonate | 30.5 | |
| Perma Kleer-OH (Refined Prod.) | do | Sod. Salt of a Polyamino Carboxylic Acid. | 31.5 | 6.29 |
| Marasperce C. (Marathon Corp.) | do | Highly Purified Calcium Lignosulfonate. | 29.5 | 6.24 |
| Ultrawet DS (Atlantic Ref.) | do | Alkyl Benzene Sodium Sulfonate | 29.5 | 6.31 |
| Armeen S (Armour Chem.) | Cationic | Soya fatty acid amine | 29.5 | 6.10 |
| Armeen T (Armour Chem.) | do | Tallow fatty acid amine | 30 | 6.15 |
| Ethomeen S/15 (Armour Chem.) | do | Soya fatty acid amine reacted with 5 mols ethylene oxide. | 29 | 5.90 |
| Aerosol 1B (American Cyanamid) | do | Diisobutyl sodium sulfosuccinate | 30 | 6.12 |
| Acidol 25 (Onyx Oil & Chem.) | do | Salt of a fatty acid tertiary amine | 30.5 | |
| Anatron FC-34 (Antara Chem.) | do | Amphoteric Fatty amino amide | 30.5 | |
| Katapol VP 532 (Antara Chem.) | do | Alkyl Polyoxyethylene glycol amine | 30 | |
| Katapone VV 328 (Antara Chem.) | do | Quaternary Ammonium chloride in isopropanol. | 30.5 | |

[1] The alpha gypsum plasters reported in this Table 3 were made by soaking 1½″ to ½″ gypsum rock for 15 minutes in a 10% solution of succinic acid neutralized with KOH and containing .1% of the surface active agent indicated.

The purpose of the calcination-inhibitor or crystal-habit-modifier is to control the growth of hemihydrate crystals to produce a crystal which is as close to a cube as possible and referred to as "squat type." A fully cubic type crystal has not been obtained but considerable improvement has been made in lowering the ratio between length to width. This lower ratio will result in a low consistency plaster when properly ground. The crystal-habit-modifier appears to function by retarding the rate of calcination and the growth of crystals.

Throughout the description of this invention, potassium succinate is given as the preferred example of crystal-habit-modifier material; however, any of the soluble aliphatic acids or their soluble alkali salts having in their molecules at least two carboxyl groups separated by two carbon atoms with a single bond between intervening carbon atoms such as referred to in the above identified Patent No. 2,448,218 to Haddon, can also be used. Such substances include succinic acid, citric acid, malic acid, and their salts or mixtures thereof. Maleic acid will also function to advantage in the course of carrying out the provided process. Succinic acid or its salt is preferred. It is within the scope of this invention to prepare the salt in situ by adding the acid and alkali separately. The process set forth is not to be limited to the crystal-growth-inhibitor or habit-modifiers referred to above, but to all material which will influence the formation of calcium sulfate hemihydrate crystals so that the shorter, wider and squatter type is formed. Throughout the description of this invention the term "crystal-habit-modifier" is to be construed as meaning such material.

It is also possible to add a thickening material such as Methocel, CMC, or alginates to the solution to increase its viscosity so that more solution will be held upon the surface of the rock particles when the solution is drained off, thereby aiding in obtaining a greater ultimate quantity of the solution upon the surface of each particle.

In Example 2 given above, a wetting agent is used in conjunction with the potassium succinate solution. The use of a wetting agent or surface active agent along with a crystal-habit-modifier is an important part of this invention for it has been discovered that the concentration of the crystal-habit-modifier may be decreased by almost as much as about 50% when such material is used. This is illustrated in a comparison of Examples 1 and 2 in which it is shown that with a wetting agent only a 10% concentration of solution is needed to duplicate the same results as an 18% solution without a wetting agent. Other surface active agents besides the alkyl aryl sulfonate set forth in Example 2 have been tried and are itemized in Table 3. From these tests of a wide variety of materials it can be concluded that most any surface active agent is satisfactory whether it be nonionic, anionic or cationic.

It will be found that the process forming the subject of this invention will have the following advantages over that of the Haddon process for making alpha gypsum: (1) There is no dilution of the solution by the water of crystallization being removed during calcination; (2) no stirring is necessary; (3) a close grading of particle size is not necessary and lumps may be used; (4) less heat is required as there is no surrounding solution which must be heated to calcination temperature; (5) simpler plant design; and (6) less loss of chemicals.

Although there has been disclosed a practical embodiment of this invention along with specific examples, theories and uses which are given to insure a clear understanding of the essence of this invention, it is not the intention to be limited thereby for obviously many variations may be made by those skilled in the art of which this invention is a part and still be within the scope of this invention which is only limited by the following claims.

I claim:

1. The process of producing calcium sulfate hemihydrate which comprises wetting the exterior surfaces of gypsum particles with a crystal-habit-modifier, draining any excess crystal-habit-modifier from between said particles and thereafter heating the thus treated gypsum in an atmosphere of saturated steam until crystals of calcium sulfate hemihydrate are formed.

2. The process as claimed in claim 1 in which a wetting agent is used to assist in introducing the solution into the gypsum particles.

3. The process as claimed in claim 1 in which the solution has been thickened by the addition of an organic thickening agent.

4. The process of producing calcium sulfate hemihydrate comprising treating the surface of gypsum particles with an aqueous solution of a crystal-habit-modifier containing an aliphatic acid radical having in its molecule at least two carboxyl groups separated by two carbon atoms with a single bond between intervening carbon atoms, draining any excess crystal-habit-modifier from between said particles and heating the thus treated gypsum in saturated steam until crystals of calcined gypsum are formed.

5. The process of converting gypsum particles of from about 2" to 16 mesh size to a plaster containing fragments of hemihydrate crystals and characterized by a low consistency, comprising treating the surfaces of said particles with about a 1.0% to about a 35% aqueous solution of a soluble crystal-growth-modifier containing an aliphatic acid radical having in its molecule at least two carboxyl groups, separated by two carbon atoms, with a single bond between intervening carbon atoms, draining any excess crystal-growth-modifier from between said particles and heating such treated particles in an atmosphere of saturated steam at a pressure of between about 14 to 40 p.s.i. gauge until stubby type crystals of calcium sulfate hemihydrate are formed, drying the crystals to remove surplus water without rehydration of the calcium sulfate hemihydrate, and grinding the product.

6. The process of producing calcium sulfate hemihydrate crystals comprising treating the exterior surface only of gypsum particles with an aqueous solution of a soluble material selected from the group consisting of aliphatic acids and their salts having in their molecule two carboxyl groups separated by two carbon atoms with a single bond between intervening carbon atoms, draining any excess aqueous solution from between said gypsum particles and heating the treated gypsum in saturated steam until crystals of calcium sulfate hemi-hydrate are formed.

7. The process of producing calcium sulfate hemihydrate crystals comprising coating the surface only of gypsum particles with an aqueous solution of potassium succinate, draining any excess aqueous solution from between said gypsum particles and heating the treated gypsum in an atmopshere of saturated steam under pressure until crystals of calcium sulfate hemihydrate are formed.

8. The process of producing calcium sulfate hemihydrate crystals comprising coating the surface of gypsum particles with an aqueous solution of succinic acid, draining any excess aqueous solution from between said gypsum particles and heating the treated gypsum in an atmosphere of saturated steam under pressure until crystals of calcium sulfate hemihydrate are formed.

9. The process recited in claim 6 wherein said aliphatic acid is succinic acid.

10. The process recited in claim 6 wherein said aqueous solution also includes a wetting agent.

11. The process of producing calcium sulfate hemihydrate crystals comprising coating the surface only of gypsum particles with an aqueous solution containing a succinate radical, draining any excess aqueous solution from between said gypsum particles and heating the treated gypsum in an atmosphere of saturated steam under pressure until crystals of calcium sulfate hemihydrate are formed.

12. The process of producing calcium sulfate hemihydrate crystals comprising coating the surface only of gypsum particles with an aqueous solution containing a soluble alkali salt of succinic acid, draining any excess aqueous solution from between said gypsum particles and heating the treated gypsum in an atmosphere of saturated steam under pressure until crystals of calcium sulfate hemihydrate are formed.

13. The process of producing calcium sulfate hemihydrate crystals which comprises treating the surface of gypsum particles with an aqueous solution of a crystal-growth-modifier selected from the group consisting of succinic acid, citric acid, malic acid, maleic acid, and their soluble salts, draining any excess crystal-growth-modifier from between said particles and heating the thus treated gypsum particles while in a state of quiescence in an atmosphere of saturated steam until stubby crystals of calcium sulfate hemihydrate are formed.

References Cited in the file of this patent

UNITED STATES PATENTS

| | | |
|---|---|---|
| 2,113,375 | Himsworth | Apr. 5, 1938 |
| 2,318,540 | Talbert | May 4, 1943 |
| 2,448,218 | Haddon | Aug. 31, 1948 |
| 2,460,267 | Haddon | Feb. 1, 1949 |
| 2,605,191 | Ingram et al. | July 29, 1952 |